United States Patent [19]

Heldenbrand

[11] Patent Number: 4,789,137

[45] Date of Patent: Dec. 6, 1988

[54] KNOCK-DOWN CATTLE GUARD

[76] Inventor: William C. Heldenbrand, HCR.69, Box 62, Gepp, Ark. 72538

[21] Appl. No.: 79,893

[22] Filed: Jul. 31, 1987

[51] Int. Cl.⁴ .............................................. A01K 3/00
[52] U.S. Cl. ....................................... 256/17; 256/14
[58] Field of Search ................. 256/14, 17, 18, 16; 49/33

[56] References Cited

U.S. PATENT DOCUMENTS

| | | | |
|---|---|---|---|
| 1,048,330 | 12/1912 | Martin | 256/17 |
| 1,529,460 | 3/1925 | Bremer . | |
| 1,569,235 | 1/1926 | Plunkett . | |
| 2,518,855 | 8/1950 | Balzer | 256/17 |
| 2,539,214 | 1/1951 | Warner | 256/14 |
| 2,592,225 | 4/1952 | Winkler | 256/14 |
| 2,644,674 | 7/1953 | Thede | 256/14 |
| 2,938,711 | 5/1960 | Luff | 256/17 |
| 3,256,637 | 6/1966 | Torrey | 49/104 |
| 3,384,352 | 5/1968 | Bruner | 256/17 X |
| 3,790,135 | 2/1974 | Christianson | 256/17 |

Primary Examiner—Andrew V. Kundrat
Attorney, Agent, or Firm—Fleit, Jacobson, Cohn & Price

[57] ABSTRACT

An elongated structure is provided including a pair of opposite end transverse end members and a plurality of laterally spaced apart and longitudinally extending bar members extending between and supported atop corresponding longitudinally spaced portions of the transverse end members. Mid-length portions of the transverse end members include upwardly and outwardly inclined shank portions over which the lower ends of upwardly and outwardly inclined bridging members are telescopingly engaged and each bridging member includes a pair of upwardly convergent bracing members whose upper ends are secured to the bridging members and whose lower ends are anchored relative to the opposite ends of the corresponding transverse member.

10 Claims, 2 Drawing Sheets

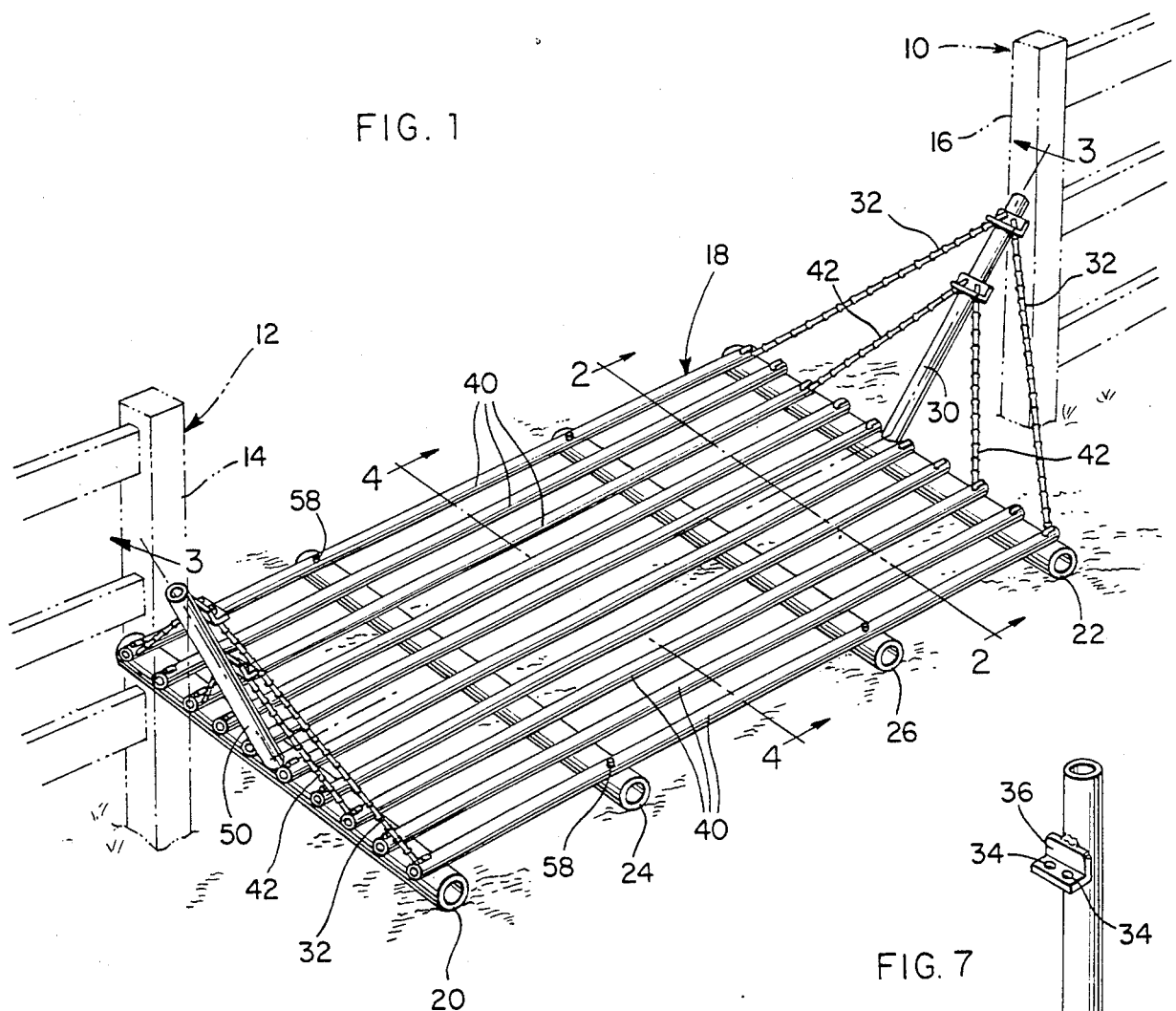
FIG. 1
FIG. 7
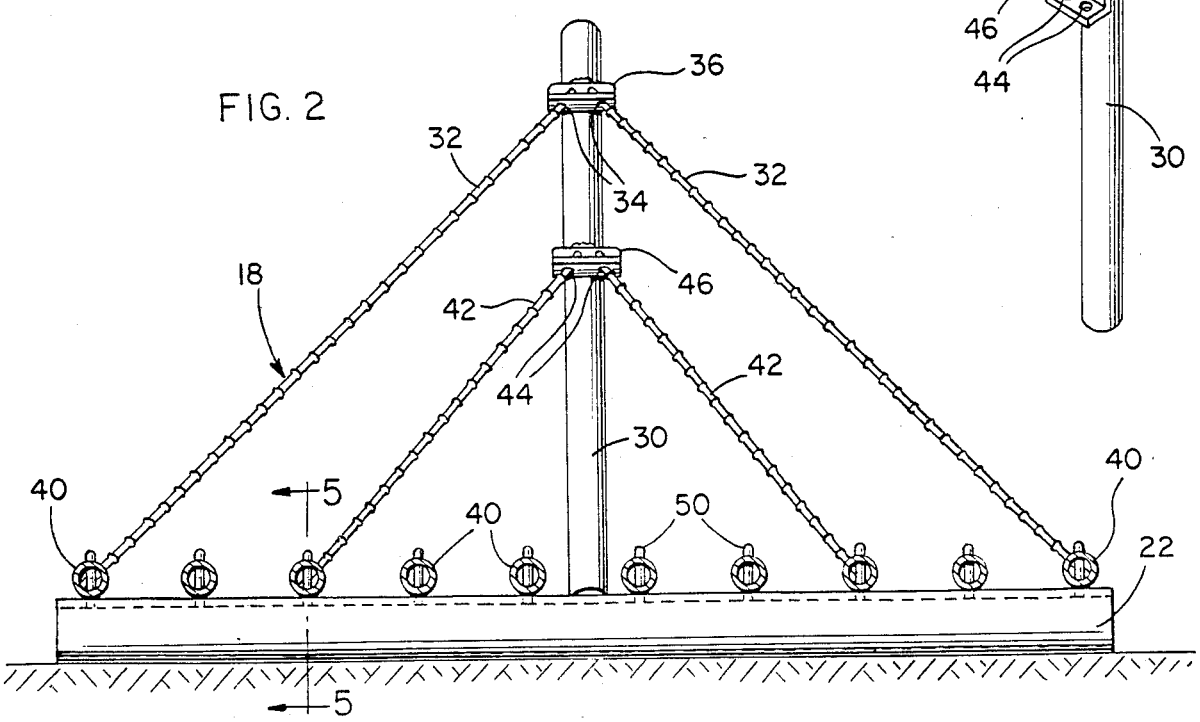
FIG. 2

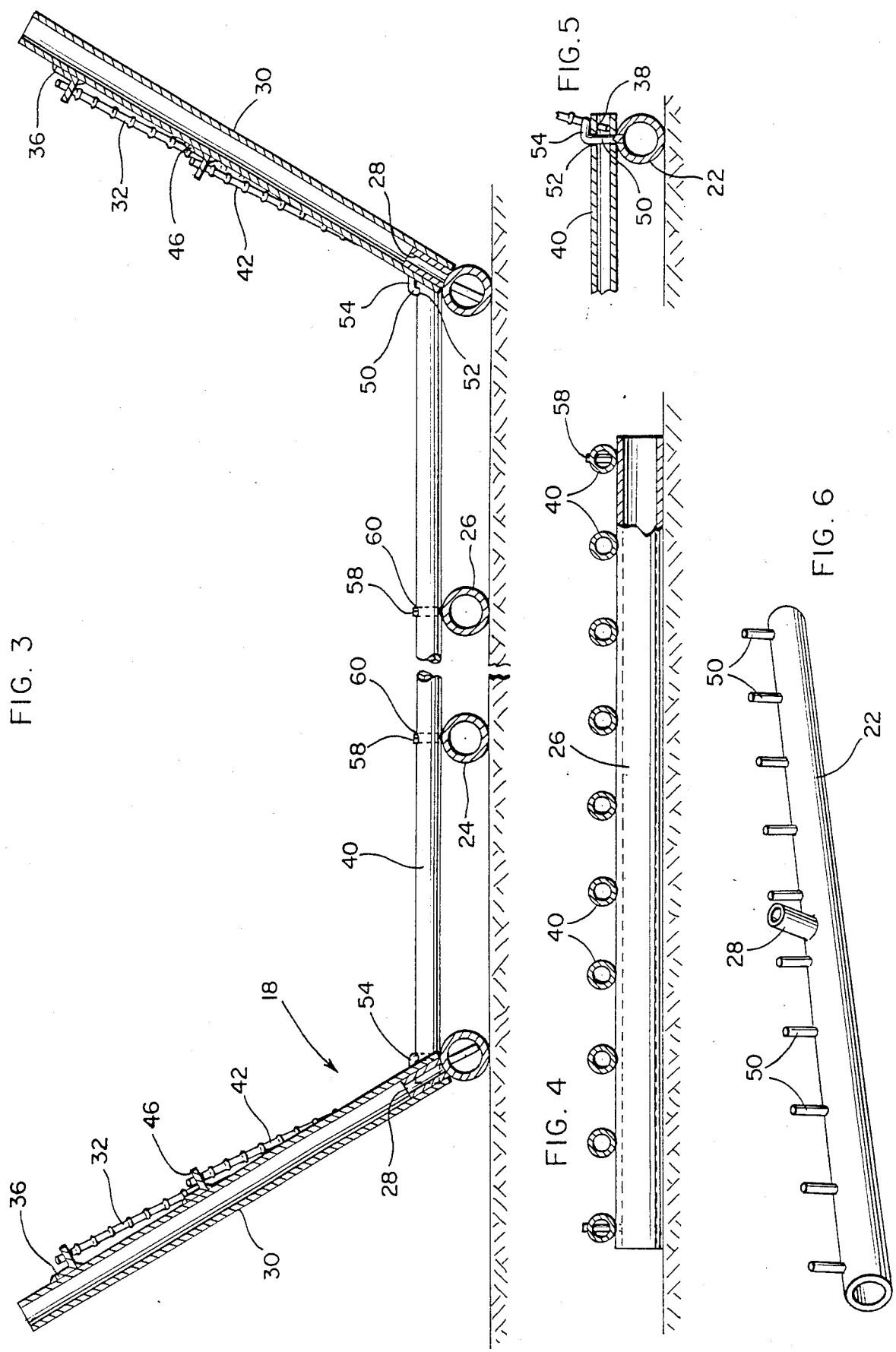

KNOCK-DOWN CATTLE GUARD

BACKGROUND OF THE INVENTION

1. Field of the Invention

Many farms and ranches have numerous fence lines through which vehicles and farm equipment must be driven and which utilize fence openings equipped with cattle guards to facilitate the movement of vehicles and farm equipment through fence lines while preventing passage of cattle through the fence openings.

The requisite structural features of a cattle guard of this type are well-known and many cattle guards are fabricated on the farms and ranches upon which they will be used. However, the fabrication of cattle guards requires the utilization of a considerable amount of materials which must be purchased in a remote location and transported to the farm or ranch. Further, preconstructed cattle guards are relatively large and may not be conveniently shipped from a manufacturer to a point of use.

Therefore, a need exists for a cattle guard which may be manufactured in a remote location and transported to a point of use in knock-down form for erection at the site of use through the utilization of minimum tools and other equipment.

2. Description of Related Art

Various different cattle guards including knock-down cattle guards and incorporating some of the general structural and operational features of the instant invention are disclosed in U.S. Pat. Nos. 1,529,460, 1,569,235, 2,539,214, 2,592,225, 2,644,674, 2,938,711, 3,256,637 and 3,384,352. However, these previously known forms of cattle guards do not include the overall structural features of the instant invention and of knock-down construction for ease of erection on site.

SUMMARY OF THE INVENTION

This invention relates to a cattle guard used to confine cattle to a specified area and to allow vehicles to enter and/or exit the area without the use of gates.

This invention is constructed of oil field tubing and drill pipe which is no longer applicable for use in producing oil. In this manner, the tubing and pipe becomes product important to the agricultural industry at a very reasonable cost.

The cattle guard comprises an elongated structure for spanning between fence posts defining a fence opening therebetween and incorporates a pair of opposite end transverse members including upwardly divergent midlength shank portions. A pair of upwardly divergent opposite end guard-to-fence post bridging members are provided having lower ends telescopingly engaged over the aforementioned shank portions and upper ends adapted to at least closely oppose mid-height portions of the opposing surfaces of the fence posts. A pair of inclined brace members are carried by each end of the guard and each pair includes lower ends supported from the opposite end portions of the corresponding transverse end member and upper ends anchored relative to the upper end of the corresponding guard-to-fence post bridging members. Further, a plurality of elongated, laterally spaced apart and longitudinally extending tubular bar members extend between and have opposite ends supported from and atop corresponding longitudinally spaced portions of the corresponding transverse opposite end members. The bar members, transverse opposite end members, guard-to-fence post bridging members and inclined brace members are individually constructed and packaged in knock-down form with each of the members being constructed in a manner enabling assembly of the cattle guard with a minimum of effort and minimum usage of tools.

The main object of this invention is to provide an effective cattle guard which may be manufactured and shipped in knock-down form and thereafter readily erected on site.

Another object of this invention is to provide a cattle guard whose major components may comprise oil field tubing and drill pipe which has served its useful life in the oil field and which can be obtained for manufacture of the cattle guard at a very reasonable price.

A still further object of this invention is to provide a knock-down cattle guard which may be readily constructed of different lengths merely by the usage of different length longitudinal members of the guard.

A further object of this invention is to provide a knock-down cattle guard which may, after being erected, be skidded to different locations.

A final object of this invention to be specifically enumerated herein is to provide a knock-down cattle guard in accordance with the preceding objects and which will conform to conventional forms of manufacture, be of simple construction and easy to erect so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the knock-down cattle guard of the instant invention in erected condition, adjacent related fence sections being illustrated in phantom lines;

FIG. 2 is an enlarged transverse vertical sectional view taken substantially upon the plane indicated by the section line 2—2 of FIG. 1;

FIG. 3 is a fragmentary longitudinal vertical sectional view taken substantially upon the plane indicated by the section line 3—3 of FIG. 1;

FIG. 4 is a transverse vertical sectional view taken substantially upon the plane indicated by the section line 4—4 of FIG. 1;

FIG. 5 is a fragmentary longitudinal vertical sectional view taken substantially upon the plane indicated by the section line 5—5 of FIG. 2;

FIG. 6 is a perspective view of one of the transverse end members of the cattle guard; and FIG. 7 is a perspective view of one of the cattle guard-to-fence post bridging members of the cattle guard.

DESCRIPTION OF THE PREFERRED EMBODIMENT

Referring now more specifically to the drawings, the numerals 10 and 12 generally designate aligned fence sections including horizontally spaced apart adjacent posts 14 and 16 defining a passageway therebetween.

The cattle guard of the instant invention is referred to in general by the reference numeral 18 and includes a pair of tubular opposite end transverse members 20 and 22 as well as a pair of longitudinally spaced transversely extending mid-length transverse members 24 and 26. The transverse members 20 and 22 include mid-length upwardly and outwardly projecting tubular shanks 28 projecting therefrom and the lower ends of a pair of upwardly divergent opposite end cattle guard-to-fence post bridging members are telescoped downwardly over the tubular shanks 28.

Each bridging member 30 includes a first pair of upwardly convergent bracing members 32 operatively associated therewith including upper ends inserted through a pair of bores 34 formed in an upper bracket 36 welded to the upper end of the bracing member 30 and lower ends inserted downwardly in upwardly opening inclined bores formed in corresponding outer side tubular bar members 40 extending between and lapped over the tubular members 20. In addition, each bridging member 30 includes a second pair of similar bracing members 42 including upper ends inserted through bores 44 formed in a mid-height bracket 46 supported from each bridging member 30 and lower ends downwardly inserted in upwardly opening bores corresponding to the bores 38 formed in intermediate width tubular bar members 40. The bracing members 32 and 42 may conveniently comprise reinforcing bars and the bores 34, 44 and 38 are of sizes and arranged relative to each other such that the reinforcing bars are slightly flexed when installed in the manner illustrated in FIGS. 1, 2, 3 and 5.

The tubular bar members 40 equal ten in number with five bar members 40 disposed on opposite sides of a plane containing the bridging members 30 and each of the transverse members 20 includes ten upright shanks 50 upwardly received through vertical bores 52 formed through the corresponding ends of the bar members 40. In addition, the shanks 50 project above the bar members 40 and are bent over as at 54, see FIGS. 3 and 5, after the cattle guard 18 is assembled. Still further, the intermediate length transverse members 24 and 26 include opposite end upwardly projecting shanks 58 upwardly received through vertical bores 60 spaced along the bar members 40 extending between the opposite ends of the transverse members 20 and 22. These shanks 58 merely serve to maintain the transverse members 24 and 26 in position relative to the bar members 40.

All of the major components of the cattle guard 18 may be shipped in knock-down configuration. Only the brackets 36 and 46 need be secured to the bridging members 30 and the tubular shanks 28 and shanks 50 are secured relative to the corresponding transverse members 20 and 22. In addition, the shanks 58 are secured relative to the transverse members 24 and 26. Otherwise, all of the components comprising the cattle guard 18 are disassembled relative to each other during shipment and may be readily assembled in a minimum amount of time without the use of tools, except for a hammer or some other tool to bend over the shanks 50 as at 54.

Further, inasmuch as the tubular elements 20, 22, 24, 26, 30 and 40 of the cattle guard 18 as well as the tubular shanks 28 are constructed of otherwise discarded oil field tubing and drill pipe which can no longer be used in the oil field, the cattle guard 18 may be manufactured at a low cost.

Inasmuch as there is some clearance between the bridging members 30 and the tubular shanks 28, the distance between the posts 14 and 16 does not need to be precise in order to assure proper bridging members 30 between the transverse members 20 and 22 and the posts 14 and 16. In addition, the bracing members 32 and 42 serve not only to brace the bridging members 32 relative to the base portion of the cattle guard comprising the transverse members 20, 22, 24 and 26 and the bar members 40, but also serve as additional bracing members between the opposite ends of the base of the cattle guard and the posts 14 and 16 to insure that cattle will not attempt to pass between either post 14 or 16 and the adjacent end of the cattle guard 18.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A knock-down elongated cattle guard for lengthwise extension between spaced fence line posts, said cattle guard including a pair of elongated laterally spaced transverse opposite end members including upwardly divergent mid-length shank portions, a pair of upwardly divergent opposite end cattle guard-to-guard post bridging members having lower ends telescopingly engaged over said shank portions and upper ends adapted to at least closely oppose mid-height portions of the opposing faces of said fence line posts, a pair of inclined brace members carried by each end of said cattle guard and including lower ends supported from the opposite end portions of the corresponding opposite end members and upper ends anchored relative to the upper end of the corresponding bridging member, a plurality of elongated, laterally spaced apart and longitudinally extending tubular bar members extending between and having opposite ends supported atop corresponding longitudinally spaced portions of said opposite end transverse members at points spaced longitudinally therealong, said longitudinally spaced portions of said opposite end members including upwardly projecting bendable studs supported therefrom, said bar members including opposite end upstanding passages formed therethrough upwardly through and above which said studs project.

2. The cattle guard of claim 1 including an additional pair of inclined brace members at each end of said cattle guard, each pair of additional inclined brace members including upper ends anchored relative to mid-height portions of the corresponding bridging member and lower ends anchored relative to the corresponding transverse end member at points spaced therealong inwardly of the lower ends of the first mentioned inclined brace members.

3. The cattle guard of claim 1 including an additional pair of laterally spaced transverse brace members generally equally laterally spaced apart and between said opposite end members and underlying and having corresponding longitudinally spaced mid-length portions of said bar members supported therefrom.

4. The cattle guard of claim 3 wherein at least the opposite ends of the bar members supported from the ends of said additional pair of transverse members are anchored relative thereto.

5. The cattle guard of claim 1 wherein the upper terminal ends of said studs projecting above said bar members are bent over said bar members to secure the latter to said opposite end members.

6. A knock-down elongated cattle guard for lengthwise extension between spaced fence line posts, said cattle guard including a pair of elongated laterally spaced transverse opposite end members including upwardly divergent mid-length shank portions, a pair of upwardly divergent opposite end cattle guard-to-guard post bridging members having lower ends telescopingly engaged over said shank portions and upper ends adapted to at least closely oppose mid-height portions of the opposing faces of said fence line posts, a pair of inclined brace members carried by each end of said cattle guard and including lower ends supported from the opposite end portions of the corresponding opposite end members and upper ends anchored relative to the upper end of the corresponding bridging member, a plurality of elongated, laterally spaced apart and longitudinally extending tubular bar members extending between and having opposite ends supported atop corresponding longitudinally spaced portions of said opposite end transverse members at points spaced longitudinally therealong, each of the bar members extending between the opposite ends of said transverse members having upwardly opening opposite end inclined bores formed therein, each pair of bores being upwardly convergent and inclined upwardly and outwardly of the side of the corresponding end member remote from the other end member, the lower ends of said inclined brace members being received in said inclined bores.

7. The cattle guard of claim 6 wherein said longitudinally spaced portions of said opposite end members include upwardly projecting bendable studs supported therefrom, said bar members including opposite end upstanding passages formed therethrough upwardly through and above which said studs project.

8. The cattle guard of claim 7 wherein the upper terminal ends of said studs projecting above said bar members are bent over said bar members to secure the latter to said opposite end members.

9. The cattle guard of claim 8 including an additional pair of laterally spaced transverse brace members generally equally laterally spaced apart and between said opposite end members and underlying and having corresponding longitudinally spaced mid-length portions of said bar members supported therefrom.

10. The cattle guard of claim 9 wherein at least the opposite ends of the bar members supported from the ends of said additional pair of transverse members are anchored relative thereto.

* * * * *